Sept. 30, 1941.  D. C. HERSTEDT  2,257,299
ANIMAL TRAP
Filed May 20, 1941   2 Sheets—Sheet 1
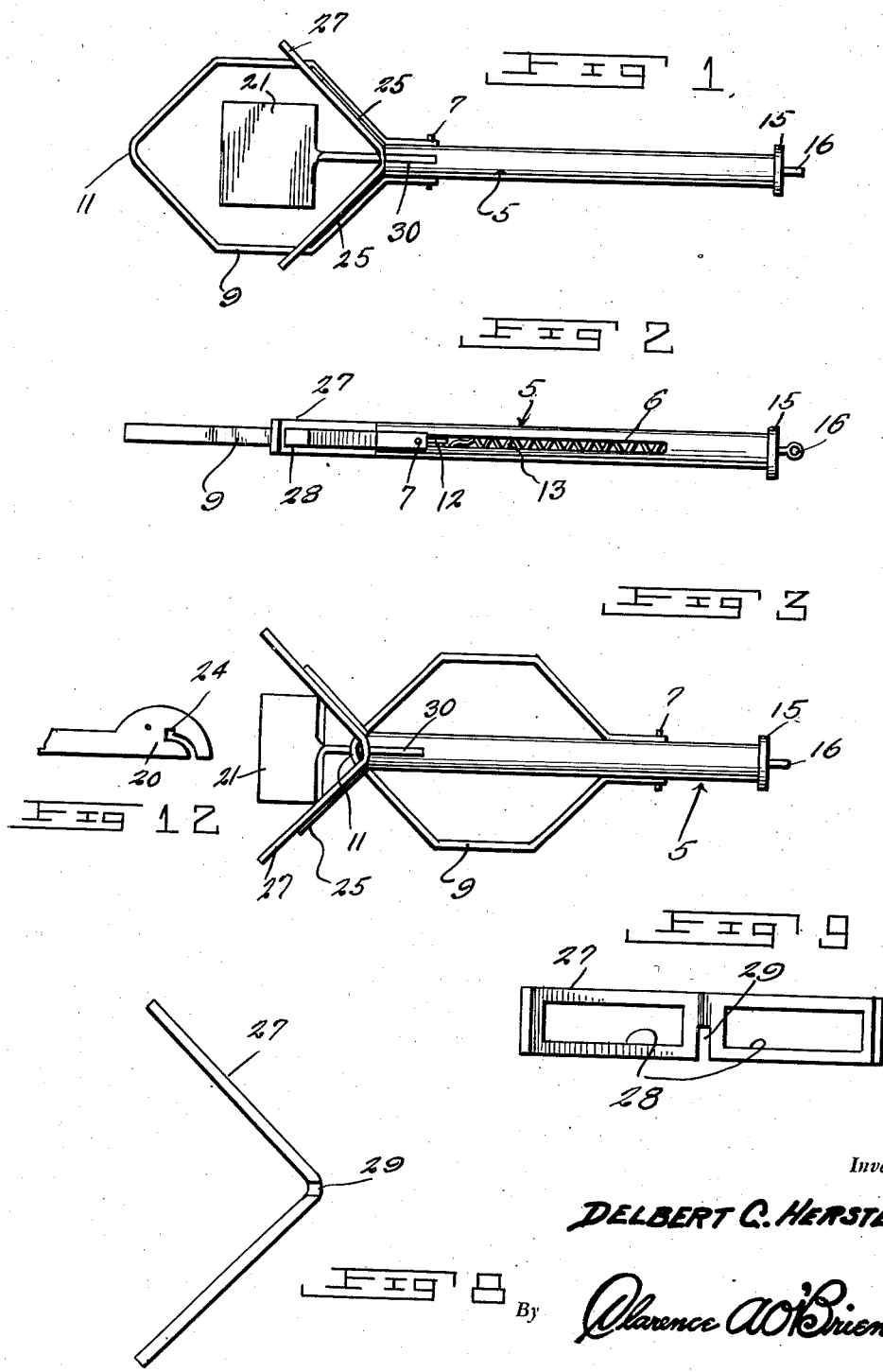
Inventor
DELBERT C. HERSTEDT
By Clarence A. O'Brien
Attorney

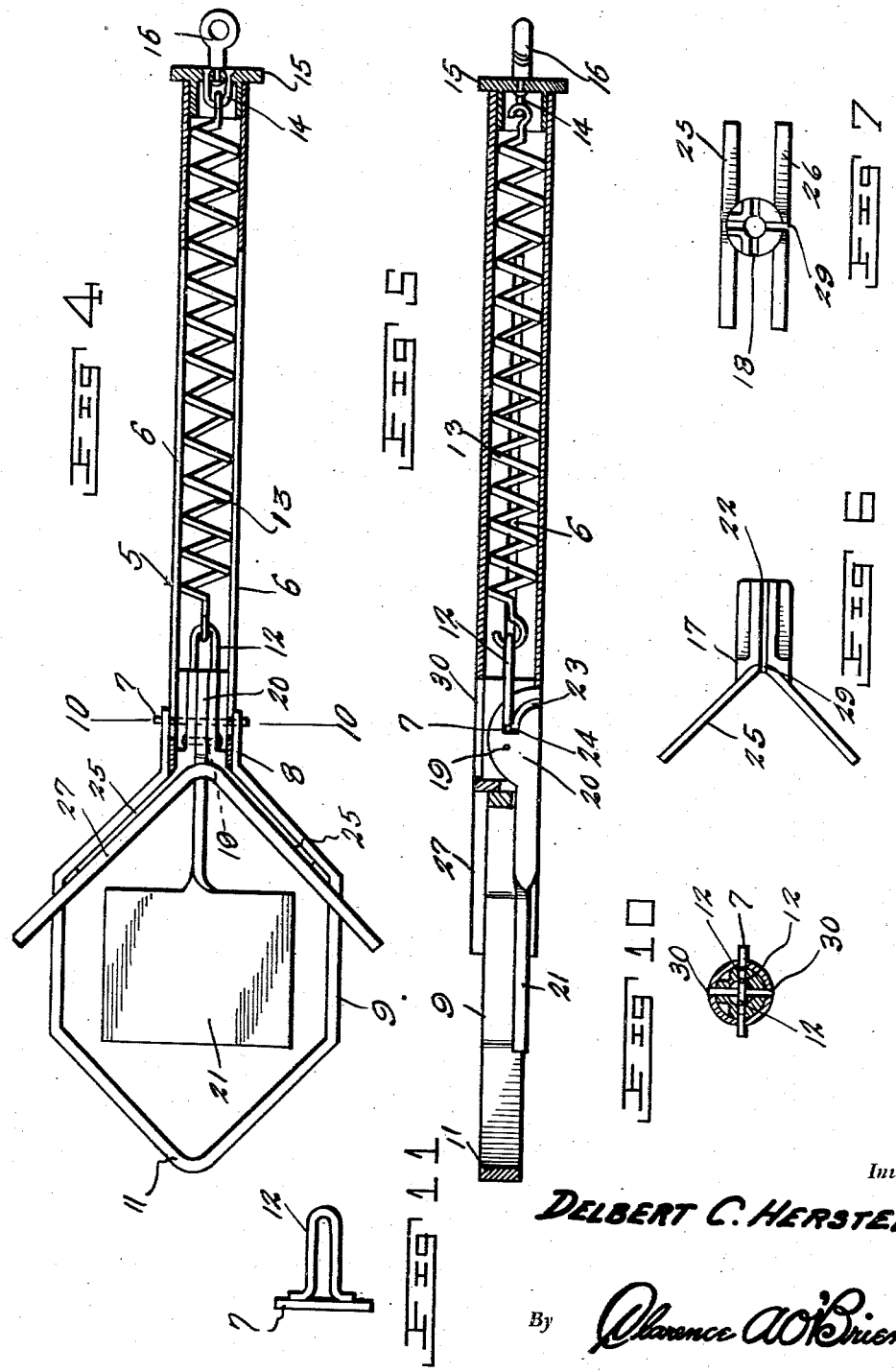

Patented Sept. 30, 1941

2,257,299

UNITED STATES PATENT OFFICE 2,257,299

ANIMAL TRAP

Delbert C. Herstedt, Moline, Ill.

Application May 20, 1941, Serial No. 394,354

4 Claims. (Cl. 43—85)

The present invention relates to new and useful improvements in animal traps of a spring retracted sliding jaw type and has for its primary object to provide a device of this character adapted for clamping the foot of the animal when the trap is sprung for the purpose of securely holding the animal against escape, but at the same time preventing injury to the fur of the animal.

A further object is to provide an animal trap of this character of simple and practical construction, which is strong and durable, relatively inexpensive to manufacture, and otherwise well adapted for the purposes for which the same is intended.

Other objects and advantages reside in the details of construction and operation as more fully hereinafter described and claimed, reference being had to the accompanying drawings forming a part hereof, wherein like numerals refer to like parts throughout, in which Figure 1 is a top plan view.

Figure 2 is a side elevational view.

Figure 3 is a top plan view showing the trap in its closed or sprung position.

Figure 4 is a longitudinal sectional view through the tube for the jaw retracting spring.

Figure 5 is a similar view taken substantially at right angles to Figure 4.

Figure 6 is a plan view of the mounting or support for the trigger.

Figure 7 is a rear end elevational view thereof.

Figure 8 is a top plan view of the guide for the sliding jaw.

Figure 9 is a front elevational view thereof.

Figure 10 is a transverse sectional view taken substantially on a line 10—10 of Figure 4.

Figure 11 is a detail of the connecting member between the spring and the sliding jaw.

Fig. 12 is a partial detail view of the trigger member.

Referring now to the drawings in detail wherein for the purpose of illustration I have disclosed the preferred embodiment of my invention, the numeral 5 designates a tubular member open at each end and having longitudinally extending slots 6 formed at diametrically opposite sides within which a transverse pin 7 is slidably mounted, the pin projecting outwardly from each side of the tube for attaching the ends 8 of a sliding jaw member 9 thereto. The jaw member 9 is of substantially hexagonal form with its inner end 8 extending in parallelism at opposite sides of the tubular member 5 and its outer end of V-shape as shown at 11.

Secured to the transverse pin 7 is an eye 12 to which one end of a retractible coiled spring 13 is attached, the coil spring being mounted in the tubular member 5 and has its other end attached to an eye 14 secured in a plug 15 at the rear end of the tube. The outer end of the plug is provided with an eye 16 to which a chain or other fastening device may be attached.

Soldered or otherwise fixedly secured in the end of the tube 5 opposite from the plug 15 is a head 17 having a slot 18 through which the pin 7 is slidably mounted, the head 17 also having a pin 19 extending transversely thereof and to which the trigger 20 is pivotally mounted, the trigger being formed at the inner end of a bait pan 21.

The head 17 is also formed with a vertical slot 22 in which the trigger 20 is pivotally mounted and the lower edge of the trigger is formed with an arcuate slot 23 terminating at its inner end in a shoulder 24, the slot being adapted to receive the transverse pin 7 for movement behind the shoulder to hold the spring 13 under tension and to prevent retractive movement of the sliding jaw 9.

It will be apparent that upon a downward movement of the pan 21, as by the weight of an animal thereon, the trigger 20 will be raised upwardly to disengage the shoulder 24 from the pin 7 whereby the spring will withdraw the pin through the arcuate slot 23 and retract the jaw 9.

The head 17 at its front end is formed with upper and lower diverging pairs of arms 25 and 26 arranged in spaced parallel relation as shown to advantage in Figure 7 of the drawings, the arms being disposed inwardly of the rear end of the jaw 9 and has welded or otherwise fixedly secured thereto a V-shaped guide 27 which constitutes the stationary jaw.

The guide 27 is formed with openings 28—28 in which the sides of the jaw 9 are slidable, the inner sides of the guide and the V-shaped outer end of the jaw 9 being opposed cooperate to clamp the foot of the aminal therebetween when the pan is depressed for releasing the trigger as shown in Figure 3.

The lower edge of the guide 27 and the upper and lower edges of the tube 5 are provided with alined slots 29 and 30 respectively to accommodate the trigger during its downward releasing movement.

It is believed the details of construction, advantages and manner of use of the device will be readily understood from the foregoing without further detailed explanation.

I claim:

1. A trap comprising a tubular member, a stationary jaw including a guide secured at one end of said member, a movable jaw in the form of a frame slidable in the guide, a trigger in the tubular member releasably securing the movable jaw against retracting movement, a bait pan projecting outwardly from the tubular member and connected to the trigger for actuating the latter to release the movable jaw and spring means urging the movable jaw into a retracted position against the stationary jaw.

2. A trap comprising a V-shaped stationary jaw constituting a guide, an open movable jaw slidably mounted in the stationary jaw and having an outer end cooperating therewith in clamping engagement, spring means for retracting the movable jaw, a trigger releasably securing the movable jaw against retracting movement and a bait pan connected to the trigger for releasing the latter.

3. A trap comprising a tube, a V-shaped stationary jaw secured in one end of the tube and including a guide, a movable jaw slidably mounted in the stationary jaw and having an outer end cooperating therewith in clamping engagement, a pin carried by the inner end of the movable jaw and disposed transversely of the tube, spring means in the tube attached to the pin for retracting the movable jaw, a trigger releasably securing the pin against retracting movement and a bait pan connected to the trigger for releasing the latter.

4. A trap comprising a tube, a stationary jaw having outwardly diverging arms provided with guide openings, a head at the junction of the arms secured in one end of the tube, said head having a transverse slot in its inner end, a movable jaw slidable in the openings of said arms and with its outer end adapted upon retraction to cooperate with the stationary jaw in clamping relation, a pin at the inner end of the movable jaw and positioned in said slot transversely of the tube, spring means in the tube attached to the pin for retracting the movable jaw, a trigger pivoted to the head and having a slot receiving the pin, a shoulder on the slot retaining the pin therein and a bait pan on the outer end of the trigger for actuating the latter to release the shoulder from the pin.

DELBERT C. HERSTEDT.